(12) United States Patent
Zhang et al.

(10) Patent No.: US 12,311,259 B2
(45) Date of Patent: May 27, 2025

(54) FORCE FEEDBACK DEVICE

(71) Applicant: AAC Acoustic Technologies (Shanghai) Co., Ltd., Shanghai (CN)

(72) Inventors: Lijin Zhang, Shenzhen (CN); Bing Xie, Shenzhen (CN); Yuntong Li, Shenzhen (CN); Liang Jiang, Shenzhen (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 382 days.

(21) Appl. No.: 18/090,515

(22) Filed: Dec. 29, 2022

(65) Prior Publication Data

US 2024/0050846 A1    Feb. 15, 2024

Related U.S. Application Data

(63) Continuation of application No. PCT/CN2022/120294, filed on Sep. 21, 2022.

(30) Foreign Application Priority Data

Aug. 10, 2022  (CN) .......................... 202210959173.0

(51) Int. Cl.
*A63F 13/24*  (2014.01)
*A63F 13/285*  (2014.01)

(52) U.S. Cl.
CPC ............ *A63F 13/285* (2014.09); *A63F 13/24* (2014.09); *A63F 2300/1037* (2013.01); *A63F 2300/1043* (2013.01)

(58) Field of Classification Search
CPC ................... A63F 13/285; A63F 13/24; A63F 2300/1037; A63F 2300/1043
See application file for complete search history.

(56) References Cited

U.S. PATENT DOCUMENTS

| | | | |
|---|---|---|---|
| 2001/0026264 A1* | 10/2001 | Rosenberg | G06F 3/0354 345/156 |
| 2013/0141225 A1* | 6/2013 | Son | G08B 6/00 340/407.1 |
| 2017/0203208 A1* | 7/2017 | Sato | A63F 13/245 |
| 2018/0345136 A1* | 12/2018 | Schmitz | G06F 3/0362 |
| 2022/0305375 A1* | 9/2022 | Morita | A63F 13/218 |
| 2023/0277926 A1* | 9/2023 | Zhang | A63F 13/285 463/37 |

* cited by examiner

*Primary Examiner* — Omkar A Deodhar
*Assistant Examiner* — Shauna-Kay Hall
(74) *Attorney, Agent, or Firm* — Wiersch Law Group

(57) ABSTRACT

A force feedback device includes a fixed portion, a button hinged to the fixed portion, an driving arm connected to a bottom of the button, and a driving assembly connected to one end of the driving arm away from the button; the fixed portion includes a fixed portion body and a bearing mounted at one end of the fixed portion body; the button includes a button body and a rotating shaft formed by protruding from one end of the button body; the driving arm is connected to a bottom of the button body; the driving assembly includes a linear vibration motor and an output shaft extending from the linear vibration motor; The force feedback device of the present invention can achieve a force feedback effect of a button, has a simple structure and good experience, and is easy to assemble.

10 Claims, 6 Drawing Sheets

FORCE FEEDBACK DEVICE

CROSS-REFERENCE TO RELATED APPLICATIONS

The application is a continuation of International Application No. PCT/CN2022/120294 filed on Sep. 21, 2022, which is incorporated herein by reference in its entireties.

TECHNICAL FIELD

The present invention relates to the technical field of force feedback, in particular to a force feedback device.

BACKGROUND

With the development of network technologies and electronic information technologies, more and more games are developed. With the development of all kinds of joysticks, virtual reality devices and augmented reality devices, users have increasingly high sensory requirements when using external devices.

At present, a tactile feedback technology has been widely used in various high-end gamepads, and has achieved good user experience and market responses. However, in some game scenarios, only the vibration cannot meet the requirements of the user experience. The tactile feedback technology includes vibration and force feedback, so it can achieve better immersion and be better used in scenarios that require a recoil force or an acting force, such as archery, racing and rocket.

A force feedback device of the related technology generally includes a driving motor, a worm wheel connected with the driving motor, a gear connected with the worm wheel, a push rod mounted on the gear, a trigger abutted with the push rod, and a torsional spring fixed on the trigger. When the driving motor is powered on, the driving motor pushes the trigger by rotating the worm wheel and then converting a force into a linear directional force by means of shifting the gear. The torsional spring can cause the trigger to return to an original position after the driving motor is powered off.

However, the force feedback device of the related technology needs to convert the rotating force into the linear directional force through the worm wheel and the gear, which makes both the structure and assembling of the force feedback device complex. The force of this structure for driving the trigger is unidirectional, so that forces in two opposite directions cannot be realized. Furthermore, the force output by the driving motor needs to be amplified through the gear for deceleration, but at the same time, the rotation speed of the trigger will decrease, so that the feedback force control effect is poor, and a user cannot be provided with a good experience.

Therefore, it is necessary to provide a new force feedback device to solve the above problems.

SUMMARY

The technical problems to be solved in the present invention are to provide a force feedback device which can achieve a force feedback effect of a button, has a simple structure and good experience, and is easy to assemble.

In order to solve the above technical problem, the present invention adopts the following technical solution: a force feedback device includes a fixed portion, a button hinged to the fixed portion, an driving arm connected to a bottom of the button, and a driving assembly connected to one end of the driving arm away from the button; the fixed portion includes a fixed portion body and a bearing mounted at one end of the fixed portion body; the button includes a button body and a rotating shaft formed by protruding from one end of the button body; the bearing is matched with the rotating shaft, and sleeves the rotating shaft to form a hinge structure, so that a hinge point is formed on the rotating shaft; the driving arm is connected to a bottom of the button body; the driving assembly includes a linear vibration motor and an output shaft extending from the linear vibration motor; the output shaft is connected to one end of the driving arm away from the button; and the linear vibration motor drives the output shaft to do linear back-and-forth motion along a vibration direction of the linear vibration motor, so that the output shaft drives the driving arm to drive the button to rotate clockwise and anticlockwise along the hinge point.

Preferably, the driving arm includes a first rod connected to the bottom of the button body and a second rod hinged to one end of the first rod away from the button body; and one end of the second rod away from the first rod is hinged to the output shaft.

Preferably, the linear vibration motor includes a base, a sliding shaft fixed to the base, a magnet unit fixed to the base, and a vibration unit which is suspended in the base by means of passing through the sliding shaft; the vibration unit includes an inner shell and a coil fixed in the inner shell; the inner shell passes through the sliding shaft and does linear back-and-forth motion along the sliding shaft; the output shaft is fixed to the inner shell; and the output shaft passes through the base, and a portion of the output shaft exposed from the base is connected with the second rod.

Preferably, the linear vibration motor further includes an elastic member; one end of the elastic member is connected to the inner shell; and the other end of the elastic member is connected with an inner side of the base.

Preferably, the force feedback device further includes a permanent magnet mounted on the button body and a hall sensor mounted on the fixed portion body; the hall sensor is located within a magnetic field range of the permanent magnet and generates an induced current by means of sensing a magnetic field of the permanent magnet; and the induced current is used for driving the coil.

Preferably, the button further includes an annular fixed wall formed by outwards protruding from the bottom of the button body; the driving arm further includes a third rod extending from one end of the first rod close to the button body; and the third rod is clamped in the fixed wall and abutted with the button body.

Preferably, the fixed portion further includes a guide rail formed by protruding from one side of the fixed portion body close to the driving arm; the first rod is provided with a sunken sliding chute; and the sliding chute is matched with the guide rail to cause the first rod to move along the guide rail.

Preferably, the driving arm includes an driving arm body connected to the bottom of the button body and a guide rail slot sunken in the driving arm body; the driving arm body is elongated; the guide rail slot extends along a lengthwise direction of the driving arm body; the output shaft includes an output shaft body and a pin protruding and extending from the output shaft body; and the pin is matched with the guide rail slot and clamped to the guide rail slot.

Preferably, the bottom of the button is arc-shaped.

Preferably, the linear vibration motor includes a base, a vibration unit suspended in the base, and a coil assembly fixed to the base and driving the vibration unit to vibrate; the vibration unit includes a magnet unit; the output shaft is fixed to the vibration unit; the output shaft passes through the base; and the pin is exposed from the base and is connected to the driving arm.

Compared with the related technology, the force feedback device of the present invention has the advantages that the linear vibration motor drives the output shaft to do linear back-and-forth motion along the vibration direction of the linear vibration motor; and the output shaft is connected to the button through the driving arm, so that the output shaft drives the driving arm to drive the button to clockwise and anticlockwise rotate along the hinge point. This structure converts the direction of the force of the linear vibration motor for driving the output shaft into the rotation direction of the button, and causes the button to undergo two forces in opposing directions. That is, a push force and a pull force in opposing directions directly act on the button. Meanwhile, the button has a larger stroke and quicker response. It is not necessary to additionally provide a transmission structure composed of a worm wheel and a gear in the related technology, but the button is directly driven by the linear vibration motor. Thus, the force feedback device has a simple structure and good user experience, and is easy to assemble.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

Embodiment I

Embodiment I of the present invention provides a force feedback device 100. The force feedback device 100 is applied to a gamepad, a virtual reality (VR) vest, a chair, and other devices. The force feedback device 100 enables a user to have better immersion in a game.

Figure 1:
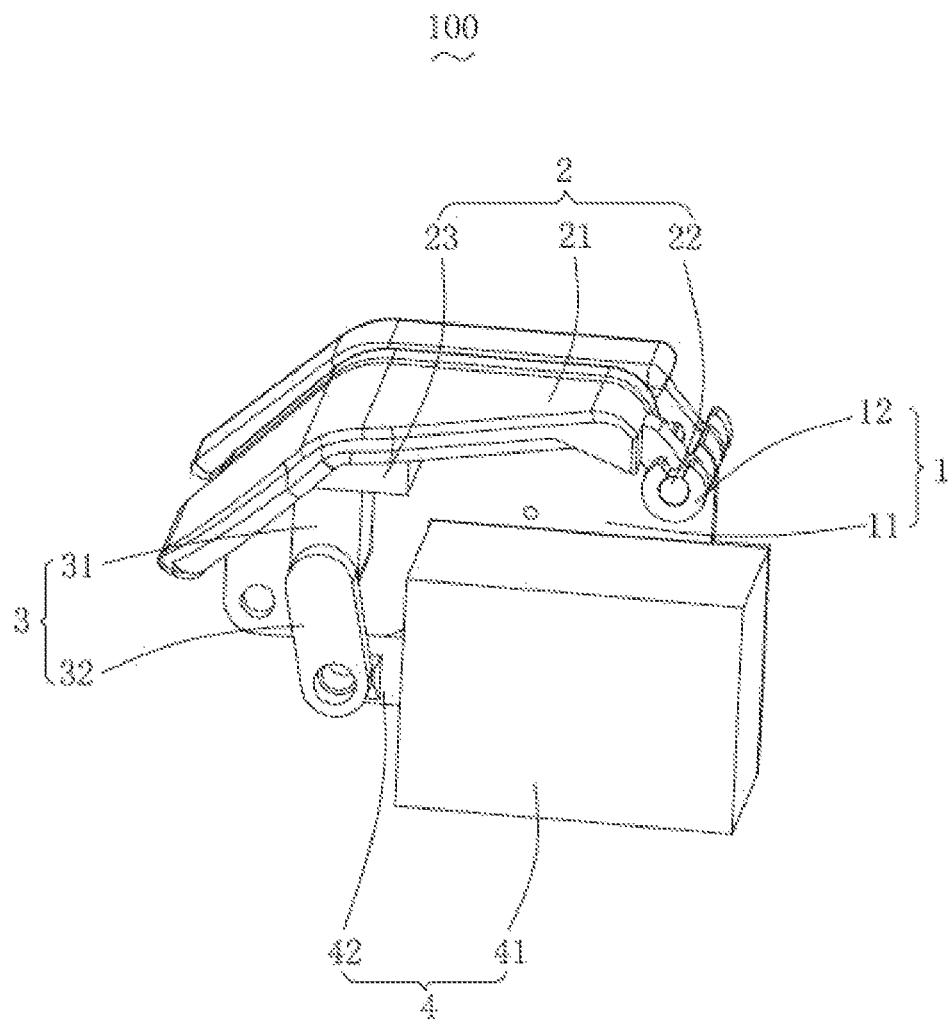
FIG. 1 is a schematic three-dimensional structural diagram of Embodiment I of a force feedback device of the present invention.
Figure 2:
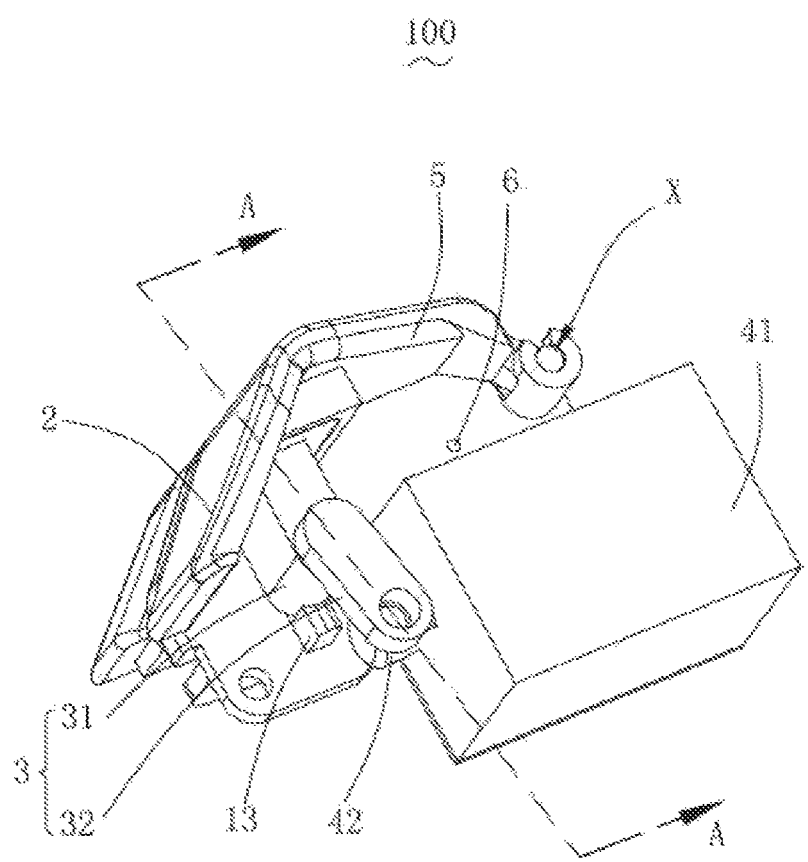
FIG. 2 is a schematic three-dimensional structural diagram of Embodiment I of a force feedback device of the present invention in another view.
Figure 3:
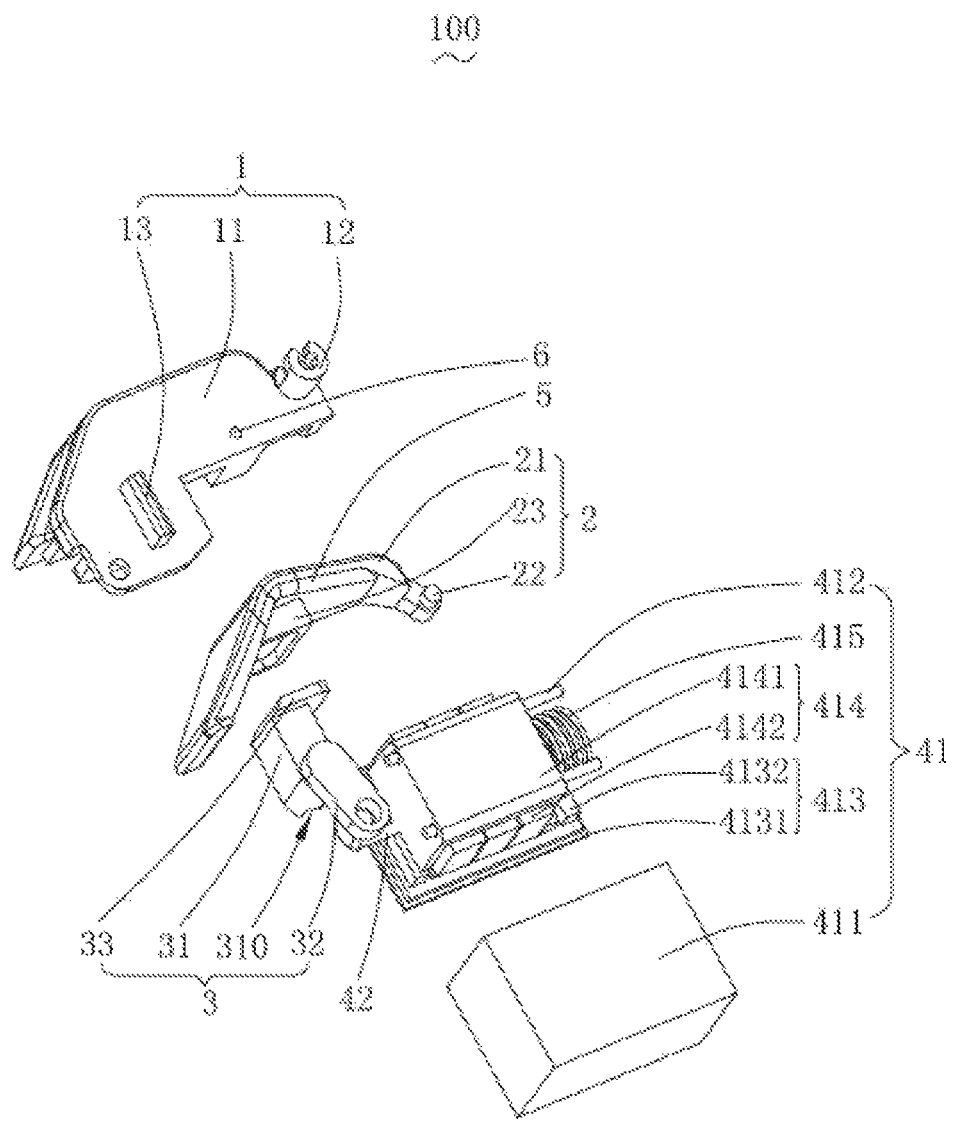
FIG. 3 is a partially three-dimensional structural exploded diagram of Embodiment I of a force feedback device of the present invention.
Figure 4:
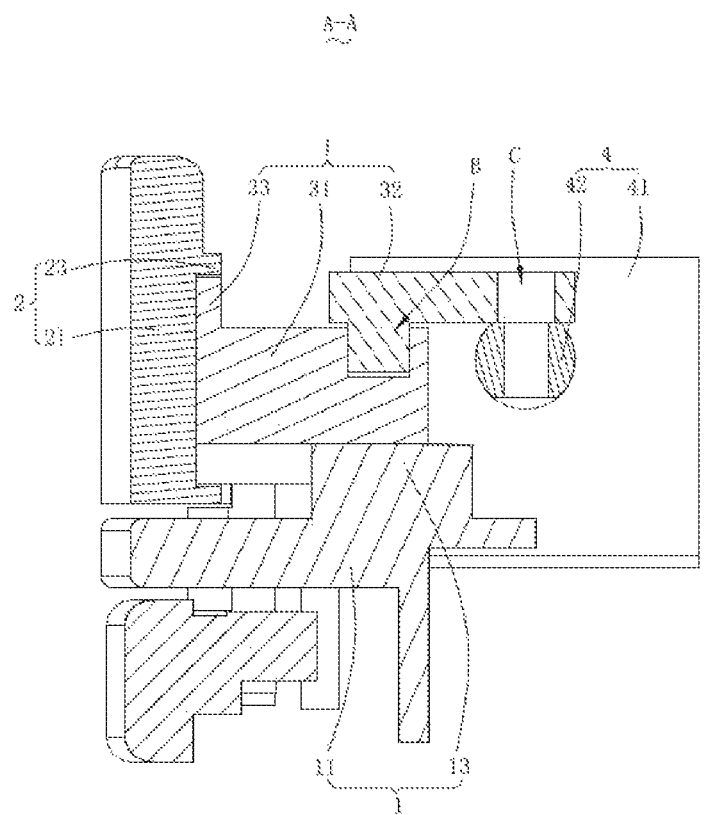
FIG. 4 is a sectional view along line A-A in FIG. 2.
Figure 5:
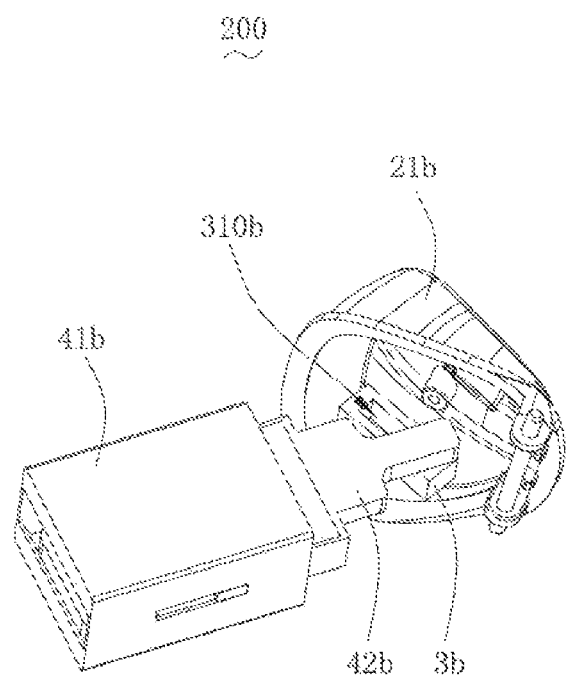
FIG. 5 is a schematic three-dimensional structural diagram of Embodiment II of a force feedback device of the present invention.
Figure 6:
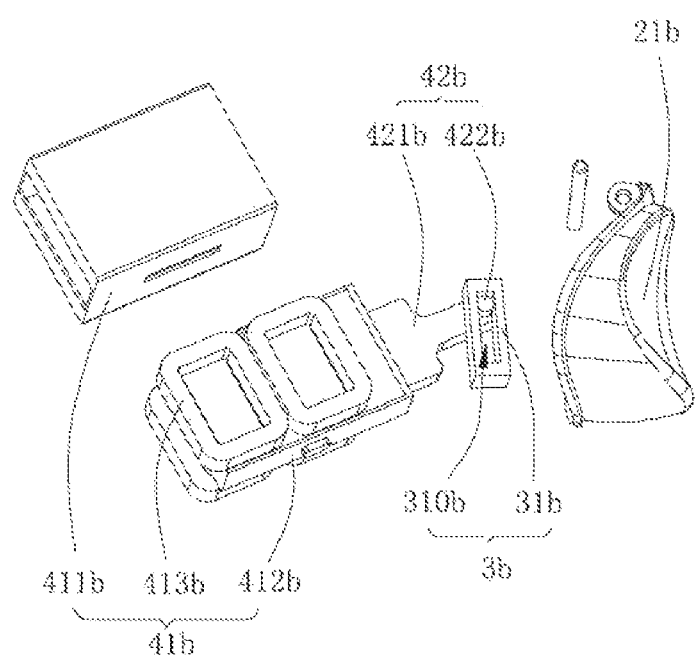
FIG. 6 is a partially three-dimensional structural exploded diagram of Embodiment II of a force feedback device of the present invention.

Referring to FIG. 1 to FIG. 4, Specifically, the force feedback device 100 includes a fixed portion 1, a button 2 hinged to the fixed portion 1, an driving arm 3 connected to a bottom of the button 2, and a driving assembly 4 connected to one end of the driving arm 3 away from the button 2. The driving assembly 4 is connected with the driving arm 3 through an output shaft 42.

The fixed portion 1 includes a fixed portion body 11 and a bearing 12 formed at one end of the fixed portion body 11.

The button 2 includes a button body 21 and a rotating shaft 22 formed by protruding from one end of the button body 21. The bearing 12 is matched with the rotating shaft 22, and sleeves the rotating shaft 22 to form a hinge structure, so that a hinge point X is formed on the rotating shaft 22.

In Embodiment I, the button 2 is a trigger. Of course, it is not limited to this. An arc-shaped body is also acceptable.

The driving arm 3 is connected to a bottom of the button body 21.

In Embodiment I, the driving arm 3 includes a first rod 31 connected to the bottom of the button body 21 and a second rod 32 hinged to one end of the first rod 31 away from the button body 21. A hinge point B is formed at hinged positions of the first rod 31 and the second rod 32.

One end of the second rod 32 away from the first rod 31 is hinged to the output shaft 42. A hinge point C is formed at connected positions of the second rod 32 and the output shaft 42.

Since the driving arm 3 is of a structure with two hinge points, i.e. the hinge point B and the hinge point C, the driving arm 3 can convert a linear force into a force that enables the button 2 to rotate along the hinge point X. It is not necessary to additionally provide a transmission structure composed of a worm wheel and a gear in the related technology in this structure, and the button 2 undergoes two forces in opposing directions, that is, a push force and a pull force directly act on the button 2. Meanwhile, the button 2 has a larger stroke and quicker response. Thus, the force feedback device 100 has a simple structure and good user experience, and is easy to assemble.

In Embodiment I, the driving arm 3 is perpendicular to the output shaft 42. This arrangement is conductive to reducing the height of the force feedback device 100, so that an entire product that uses the force feedback device 100 is minimized.

In Embodiment I, the driving arm 3 further includes a third rod 33 extending from one end of the first rod 31 close to the button body 21. The button 2 further includes an annular fixed wall 23 formed by outwards protruding from the bottom of the button body 21. The third rod 33 is clamped in the fixed wall 23 and is abutted with the button body 21. By this structure, the connection reliability for the driving arm 3 and the button 2 can be improved to prevent the moving driving arm 3 from being separated from the button 2, and the force feedback device 100 can have a simple structure and be easy to assemble.

In Embodiment I, the fixed portion 1 further includes a guide rail 13 formed by protruding from one side of the fixed portion body 11 close to the driving arm 3. The first rod 31 is provided with a sunken sliding chute 310. The sliding chute 310 is matched with the guide rail 13 to cause the first rod 31 to move along the guide rail 13. This structure improves the stability of the two forces in opposing directions on the button 2, increases the response speed, and prevents the risk of separation of the driving arm 3 during use and assembling, thus improving the reliability of the force feedback device 100. More preferably, the guide rail 13 is perpendicular to the output shaft 42. This arrangement is conductive to reducing the height of the force feedback device 100, so that an entire product that uses the force feedback device 100 is minimized.

The driving assembly 4 includes a linear vibration motor 41 and the output shaft 42 extending from the linear vibration motor 41. The output shaft 42 is connected to one end of the driving arm 3 away from the button 2. The linear vibration motor 41 drives the output shaft 42 to do linear back-and-forth motion along a vibration direction of the linear vibration motor 41, so that the output shaft 42 drives the driving arm 3 to drive the button 2 to clockwise and anticlockwise rotate along the hinge point X. This structure converts the direction of the force of the linear vibration motor 41 for driving the output shaft 42 into the rotation direction of the button 2, and causes the button 2 to undergo two forces in opposing directions. That is, a push force and a pull force in opposing directions directly act on the button 2. Meanwhile, the button 2 has a larger stroke and quicker response. It is not necessary to additionally provide a transmission structure composed of a worm wheel and a gear in the related technology, but the button 2 is directly driven by the linear vibration motor 41. Thus, the force feedback device 100 has a simple structure and good user experience, and is easy to assemble.

The linear vibration motor 41 is used for providing a driving force for the linear back-and-forth motion of the output shaft 42. In Embodiment I, the linear vibration motor 41 includes a base 411, a sliding shaft 412 fixed to the base 411, a magnet unit 413 fixed to the base 411, and a vibration unit 414 suspended in the base 411 by means of passing through the sliding shaft 412.

The magnet unit 413 includes a yoke 4131 fixed to the base 411 and a plurality of magnet 4132 fixed to one side of the yoke 4131 away from the base 411.

The vibration unit 414 includes an inner shell 4141 and a coil 4142 fixed in the inner shell 4141. The inner shell 4141 passes through the sliding shaft 412 and does linear back-and-forth motion along the sliding shaft 412. The output shaft 42 is fixed to the inner shell 4141. The output shaft 42 passes through the base 411, and a portion of the output shaft exposed from the base 411 is connected with the second rod 32. After the coil 4142 is energized, the vibration unit 414 in the linear vibration motor 41 is pushed by an electromagnetic force to do linear back-and-forth sliding along the sliding shaft 412. The vibration unit 414 drives the driving arm 3 through the output shaft 42 to push out the button 2. The force applied to the button 2 can be adjusted by changing the magnitude and direction of the current of the coil 4142. The structure of the linear vibration motor 41 can provide an accurate driving force within short time. The structure is simple, and the driving force is strong. The structure can be matched with that of the driving arm 3, making the button 2 have a larger stroke and quicker response, so that the force feedback device 100 has a simple structure and good user experience, and is easy to assemble.

Of course, the present invention is not limited to this. The linear vibration motor 41 may also adopt a common linear vibration motor of other structures in the art.

In order to reset the output shaft 42 after the coil 4142 is deenergized, the linear vibration motor 41 further includes an elastic member 415 for resetting the inner shell 4141 after the coil 4142 is deenergized. One end of the elastic member 415 is connected to the inner shell 4141, and the other end of the elastic member 415 is connected to an inner side of the base 411. The elastic member 415 is a spring.

The force feedback device 100 includes a permanent magnet 5 mounted on the button body 21 and a hall sensor 6 mounted on the fixed portion body 11. The hall sensor 6 is located within a magnetic field range of the permanent magnet 5 and generates induced current by sensing a magnetic field of permanent magnet 5. When the button 2 rotates, the hall sensor 6 is within the magnetic field range of the permanent magnet 5 mounted on the button 2. The induced current is used for driving the coil 4142. When the button 2 is pressed, the button 2 will rotate downward under a pressure. The permanent magnet 5 mounted on the button body 21 will change its position, so that the hall sensor 6 can read position information of the button 2. Thus, a vibration or force feedback signal is input to the coil 4142.

Embodiment II

Embodiment II of the present invention provides a force feedback device 200. The structure of the force feedback device 200 in Embodiment II of the present invention is basically the same as that of the force feedback device structure 100 in Embodiment I of the present invention, but differences between them are as follows:

The driving arm 3b includes an driving arm body 31b connected to the bottom of the button body 21b and a guide rail slot 310b sunken in the driving arm body 31b.

The driving arm body 31b is elongated. The guide rail slot 310b extends along a lengthwise direction of the driving arm body 31b.

The output shaft 42b includes an output shaft body 421b and a pin 422b protruding and extending from the output shaft body 421b. The pin post 422b is matched with the guide rail slot 310b and clamped to the guide rail slot 310b. The structure of the driving arm 3b in Embodiment II is realized by combining the pin 422b and the guide rail slot 310b, which can convert the linear force into the rotation force of the button body 21b along the hinge point X. It is not necessary to additionally provide a transmission structure composed of a worm wheel and a gear in the related technology in this structure, and the button body 21b undergoes two forces in opposing directions, that is, a push force and a pull force directly act on the button body 21b. Meanwhile, the button body 21b has a larger stroke and quicker response. Thus, the force feedback device 200 has a simple structure and good user experience, and is easy to assemble.

In order to better increase the stroke and response of the button body 21b, in Embodiment II, the bottom of the button body 21b is arc-shaped. Of course, it is not limited to this. The button body 21b can also be set to in other shapes conducive to a larger stroke, such as a slope shape and a triangle.

In Embodiment II, the linear vibration motor 41b has a simpler structure and smaller volume, which is conducive to the assembling of the force feedback device 200. The structure of the linear vibration motor 41b is as specifically follows: The linear vibration motor 41b includes a base 411b, a vibration unit 412b suspended in the base 411b, and a coil assembly 413b fixed on the base 411b and driving the vibration unit 412b to vibrate.

The vibration unit 412b includes a magnet unit.

The output shaft 42b is fixed to the vibration unit 412b. The output shaft 42b passes through the base 411b, and the pin 422b is exposed from the base 411b and connected to the driving arm 3b.

Compared with the related technology, the force feedback device of the present invention has the advantages that the linear vibration motor drives the output shaft to do linear back-and-forth motion along the vibration direction of the linear vibration motor; and the output shaft is connected to the button through the driving arm, so that the output shaft drives the driving arm to drive the button to clockwise and anticlockwise rotate along the hinge point. This structure converts the direction of the force of the linear vibration motor for driving the output shaft into the rotation direction of the button, and causes the button to undergo two forces in opposing directions. That is, a push force and a pull force in opposing directions directly act on the button. Meanwhile, the button has a larger stroke and quicker response. It is not necessary to additionally provide a transmission structure composed of a worm wheel and a gear in the related technology, but the button is directly driven by the linear vibration motor. Thus, the force feedback device has a simple structure and good user experience, and is easy to assemble.

The foregoing is merely illustrative of embodiments of the present invention, and it should be noted that modifications may be made to those skilled in the art without departing from the spirit of the invention, but are intended to be within the scope of the invention.

What is claimed is:

1. A force feedback device, wherein the force feedback device comprises a fixed portion, a button hinged to the fixed portion, an driving arm connected to a bottom of the button, and a driving assembly connected to one end of the driving arm away from the button;
   the fixed portion comprises a fixed portion body and a bearing mounted at one end of the fixed portion body; the button comprises a button body and a rotating shaft formed by protruding from one end of the button body; the bearing is matched with the rotating shaft, and sleeves the rotating shaft to form a hinge structure, so that a hinge point is formed on the rotating shaft; the driving arm is connected to a bottom of the button body;
   the driving assembly comprises a linear vibration motor and an output shaft extending from the linear vibration motor; the output shaft is connected to one end of the driving arm away from the button; and the linear vibration motor drives the output shaft to do linear back-and-forth motion along a vibration direction of the linear vibration motor, so that the output shaft drives the driving arm to drive the button to rotate clockwise and anticlockwise along the hinge point.

2. The force feedback device according to claim 1, wherein the driving arm comprises a first rod connected to the bottom of the button body and a second rod hinged to one end of the first rod away from the button body; and one end of the second rod away from the first rod is hinged to the output shaft.

3. The force feedback device according to claim 2, wherein the linear vibration motor comprises a base, a sliding shaft fixed to the base, a magnet unit fixed to the base, and a vibration unit which is suspended in the base by means of passing through the sliding shaft; the vibration unit comprises an inner shell and a coil fixed in the inner shell; the inner shell passes through the sliding shaft and does linear back-and-forth motion along the sliding shaft; the output shaft is fixed to the inner shell; and the output shaft passes through the base, and a portion of the output shaft exposed from the base is connected with the second rod.

4. The force feedback device according to claim 3, wherein the linear vibration motor further comprises an elastic member; one end of the elastic member is connected to the inner shell; and the other end of the elastic member is connected with an inner side of the base.

5. The force feedback device according to claim 3, wherein the force feedback device further comprises a permanent magnet mounted on the button body and a hall sensor mounted on the fixed portion body; the hall sensor is located within a magnetic field range of the permanent magnet and generates an induced current by means of sensing a magnetic field of the permanent magnet; and the induced current is used for driving the coil.

6. The force feedback device according to claim 2, wherein the button further comprises an annular fixed wall formed by outwards protruding from the bottom of the button body; the driving arm further comprises a third rod extending from one end of the first rod close to the button body; and the third rod is clamped in the fixed wall and abutted with the button body.

7. The force feedback device according to claim 2, wherein the fixed portion further comprises a guide rail formed by protruding from one side of the fixed portion body close to the driving arm; the first rod is provided with a sunken sliding chute; and the sliding chute is matched with the guide rail to cause the first rod to move along the guide rail.

8. The force feedback device according to claim 1, wherein the driving arm comprises an driving arm body connected to the bottom of the button body and a guide rail slot sunken in the driving arm body; the driving arm body is elongated; the guide rail slot extends along a lengthwise direction of the driving arm body; the output shaft comprises an output shaft body and a pin protruding and extending from the output shaft body; and the pin is matched with the guide rail slot and clamped to the guide rail slot.

9. The force feedback device according to claim 8, wherein the bottom of the button is arc-shaped.

10. The force feedback device according to claim 8, wherein the linear vibration motor comprises a base, a vibration unit suspended in the base, and a coil assembly fixed to the base and driving the vibration unit to vibrate; the vibration unit comprises a magnet unit; the output shaft is fixed to the vibration unit; the output shaft passes through the base; and the pin is exposed from the base and is connected to the driving arm.

* * * * *